United States Patent
Deshong

(10) Patent No.: US 8,295,224 B1
(45) Date of Patent: Oct. 23, 2012

(54) WIRELESS SIGNAL TRANSCEIVER SYSTEM

(76) Inventor: Rick L. Deshong, Rouzerville, PA (US)

( * ) Notice: Subject to any disclaimer, the term of this patent is extended or adjusted under 35 U.S.C. 154(b) by 289 days.

(21) Appl. No.: 12/725,232

(22) Filed: Mar. 16, 2010

(51) Int. Cl.
*H04B 7/185* (2006.01)

(52) U.S. Cl. ........ 370/316; 370/401; 370/352; 370/338; 725/63

(58) Field of Classification Search ................... 370/401, 370/316, 352, 338
See application file for complete search history.

(56) References Cited

U.S. PATENT DOCUMENTS

| | | | |
|---|---|---|---|
| 3,968,327 A | 7/1976 | Gregg | |
| 4,994,909 A | 2/1991 | Graves | |
| 5,047,860 A | 9/1991 | Rogalski | |
| 5,835,128 A | 11/1998 | Macdonald | |
| 6,038,425 A | 3/2000 | Jeffrey | |
| 6,202,211 B1 | 3/2001 | Williams | |
| 6,263,503 B1 | 7/2001 | Margulis | |
| 6,622,307 B1 | 9/2003 | Ho | |
| 6,710,815 B1 * | 3/2004 | Billmaier et al. ............. | 348/515 |
| 6,970,072 B1 | 11/2005 | Cregg | |
| 7,120,139 B1 * | 10/2006 | Kung et al. .................... | 370/352 |
| 7,274,740 B2 | 9/2007 | van Beek | |
| 2008/0159265 A1 * | 7/2008 | Deng et al. ..................... | 370/352 |
| 2009/0228782 A1 * | 9/2009 | Fraser ............................ | 715/234 |
| 2009/0271834 A1 * | 10/2009 | Asmussen ...................... | 725/106 |
| 2010/0014447 A1 * | 1/2010 | Go et al. ......................... | 370/310 |
| 2012/0030718 A1 * | 2/2012 | Margulis ......................... | 725/81 |

* cited by examiner

*Primary Examiner* — Duc C Ho
(74) *Attorney, Agent, or Firm* — Neustel Law Offices

(57) ABSTRACT

A wireless signal transceiver system for allowing wireless distribution of cable/satellite television and internet signals to a plurality of transceivers. The wireless signal transceiver system generally includes a primary unit and one or more secondary units. The primary unit of the present invention will generally be connected to a cable and/or satellite source via a wired connection. The primary unit will generally manipulate, filter and transfer television and/or internet signals to the one or more secondary units. Each secondary unit may be connected to a display device such as a television or a secondary device such as a personal computer or VOIP phone. Utilizing a primary transceiver on the primary unit and secondary transceivers on each secondary unit, a single primary unit may fulfill the functionality of a cable modem, wireless router and wireless television distributor without the need for multiple electronic devices or wires.

1 Claim, 3 Drawing Sheets

WIRELESS SIGNAL TRANSCEIVER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a system for distributing, processing and receiving signals and more specifically it relates to a wireless signal transceiver system for allowing wireless distribution of cable/satellite television and internet signals to a plurality of transceivers.

2. Description of the Related Art

Any discussion of the related art throughout the specification should in no way be considered as an admission that such related art is widely known or forms part of common general knowledge in the field.

In homes with multiple televisions, if it is often cumbersome and aesthetically unpleasing to run cables or other cords from the source of the television signal to the plurality of televisions. To combat such problems, systems for the wireless distribution of television signals throughout a single dwelling or building have been in use for years. Such previously existing systems are generally comprised of a transmitter positioned at or near the source of the television signals and one or more receivers which are directly connected to one or more televisions. The transmitter of such a previously existing system will generally receive, process and transmit the television signal to the one or more receivers, which will then allow viewing of the television signal on the one or more televisions. One such previously existing system for wirelessly distributing televisions is disclosed in U.S. Pat. No. 6,263,503 to Margulis entitled "Method for Effectively Implementing a Wireless Television System".

However, even with the use of such a wireless television transmittal system, operators are still left to cope with the cumbersome wires and other cords associated with distribution of an internet signal throughout the home. Because television and internet signals are commonly transmitted into a home through a single coaxial cable, that cable will often need to be split, with the first half of the split going to a cable television box or transmitter and the second half of the split going to a cable modem. Such a configuration, even with the use of a wireless television transmittal system, will often lead to a tangled mess of cords and wires.

Because of the inherent problems with the related art, there is a need for a new and improved wireless signal transceiver system for allowing wireless distribution of cable/satellite television and internet signals to a plurality of transceivers.

BRIEF SUMMARY OF THE INVENTION

A system for allowing wireless distribution of cable/satellite television and internet signals to a plurality of transceivers. The invention generally relates to a wireless signal transceiver system which includes a primary unit and one or more secondary units. The primary unit of the present invention will generally be connected to a cable and/or satellite source via a wired connection. The primary unit will generally manipulate, filter and transfer television and/or internet signals to the one or more secondary units. Each secondary unit may be connected to a display device such as a television or a secondary device such as a personal computer or VOIP phone. Utilizing a primary transceiver on the primary unit and secondary transceivers on each secondary unit, a single primary unit may fulfill the functionality of a cable modem, wireless router and wireless television distributor without the need for multiple electronic devices or wires.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
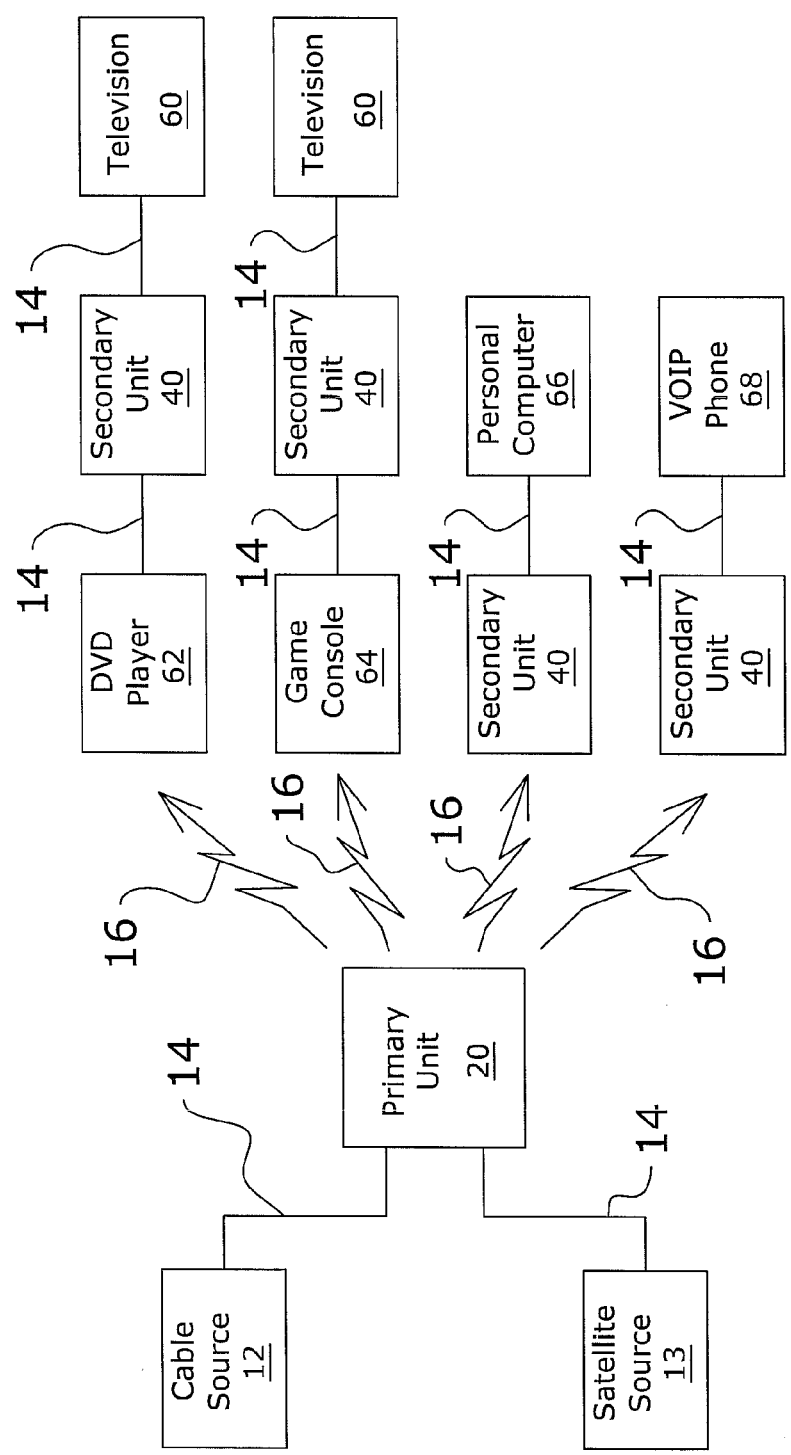
FIG. 1 is a block diagram of one embodiment of the present invention.

Turning now descriptively to the drawings, in which similar reference characters denote similar elements throughout the several views, FIGS. 1 through 5 illustrate a wireless signal transceiver system 10. As shown in FIG. 1, the present invention is generally comprised of a primary unit 20 and one or more secondary units 40. The primary unit 20 of the present invention will generally be connected to a cable and/or satellite source 12, 13 via a wired connection 14. The primary unit 20 will generally manipulate, filter and transfer television and/or internet signals to the one or more secondary units 40. Each secondary unit 40 may be connected to a display device such as a television 60 or a secondary device such as a personal computer 66 or VOIP phone 68. Utilizing a primary transceiver 28 on the primary unit 20 and secondary transceivers 50 on each secondary unit 40, a single primary unit 20 may fulfill the functionality of a cable modem, wireless router and wireless television distributor without the need for multiple electronic devices or wires.

B. Primary Unit

The primary unit 20 of the present invention will generally be comprised of electronic components interconnected within a common housing. The primary unit 20 will generally act to receive, process, filter, compress and distribute both a television signal and wireless internet signal to a plurality of secondary units 40. The primary unit 20 will preferably be configured to simultaneously perform the functions of a cable modem, wireless router, cable/satellite television signal distributor, digital video recorder and hub for a VOIP telephone within a single housing.

The primary unit 20 may be comprised of various configurations and designs, but will generally be comprised of a discrete box containing electronic components therein and a plurality of inputs and outputs. The primary unit 20 may be designed with many different appearances without affecting the overall operation of the present invention. It is also appreciated that the internal electronic components of the primary unit 20 may vary and should not be limited to the exemplary configurations disclosed herein.

The primary unit 20 will generally be powered by a wired connection to a power source such as a power socket. It is also appreciated that, in some embodiments, a battery backup may be included within the primary unit 20 to provide continual functionality even during power outages.

Figure 2:
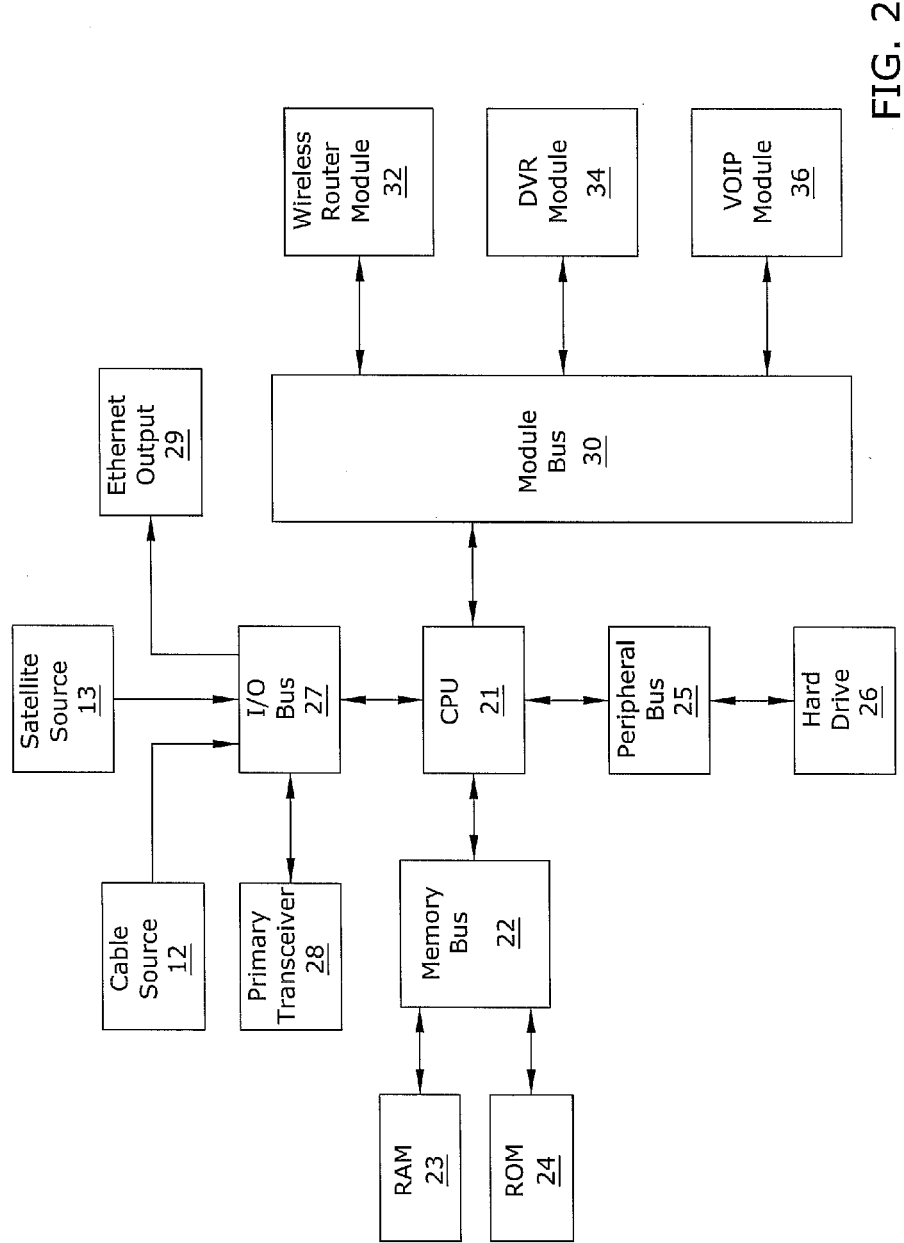
FIG. 2 is a block diagram illustrating one embodiment of a primary unit for use with the present invention.

FIG. 2 is a block diagram of an exemplary primary unit 20 for performing the various functions of the present invention. The primary unit 20 generally includes a microprocessor 21, a memory bus 22, random access memory 23, read only memory 24, a peripheral bus 25, a hard disk drive 26, an input/output bus 27, a primary transceiver 28 and at least one Ethernet output 29. The primary unit 20 will also generally include one or more inputs connected to the input/output bus 27 for receiving a signal from a cable signal source 12 and/or satellite signal source 13. Additionally, the primary unit 20 will generally include a module bus 30, a wireless router module 32, a digital video recorder module 34 and a VOIP module 36.

The microprocessor 21 is generally comprised of a general purpose digital processer that controls the overall operation of the primary unit 20. The microprocessor 21 may be a single-chip processor or may be implemented with multiple processors or components. Using instruction retrieved from memory such as RAM 23 or ROM 24, the microprocessor 21 controls the reception, processing, filtering, manipulation and transmittal of input signals 12, 13 to one or more secondary units 40.

The memory bus 22 is utilized by the microprocessor 21 to access the RAM 23 and the ROM 24 of the primary unit 20. RAM 23 is utilized by the microprocessor 21 as a general storage area and as scratch-pad memory, and can also be used to store input data and processed data. ROM 24 may be used to store instructions or program code which is followed by the microprocessor 21 as it directs the functionality of the present invention.

The peripheral bus 25 is utilized by the microprocessor 21 to access storage devices used by the primary unit 20. In the described embodiment, such devices may include a hard disk drive 26. The hard disk drive 26 utilized by the primary unit 20 of the present invention may be comprised of various configurations, but will generally be comprised of a standard SATA or USB internal hard drive. It is appreciated that any type of hard drive 26 may be utilized with the primary unit 20 of the present invention, so long as the hard drive 26 is capable of storing and transferring data upon request by the microprocessor 21.

The input/output bus 27 is used by the microprocessor 21 of the primary unit 20 to access and transmit data to/from the cable source 12, satellite source 13, primary transceiver 28 and/or Ethernet output 29. The input/output bus 27 will generally act to process, filter and transfer data (i.e. a television signal and/or internet signal) from the cable source 12. The input/output bus 27 will also act to process, filter and transfer data from the satellite source 13 on embodiments of the primary unit 20 which support receipt of satellite signals. The input/output bus 27 will additionally be utilized by the microprocessor 21 to transmit data through the Ethernet output 29 of the primary unit 20. The Ethernet output 29 of the primary unit 20 will generally be comprised of a standard output jack for transmitting internet signals via Ethernet. However, it is appreciated that other formats may be utilized to accommodate future technologies.

The input/output bus 27 will also generally be utilized by the microprocessor 21 as it directs the receipt and/or transmission of signals and datastreams through the primary transceiver 28. The primary transceiver 28 will generally be comprised of a transceiver capable of transmitting and/or receiving various types of signal for use by the primary unit 20 and secondary units 40 of the present invention. By way of example, the primary transceiver 28 could be comprised of a transceiver capable of sending and receiving such signals as WI-FI, radio frequency signals, digital signals, analog signals and the like.

The primary unit 20 will also generally include a module bus 30 which is utilized by the microprocessor 21 to direct and/or access the functionality of the various modules 32, 34, 36, 38 of the present invention. Although more or less modules may be utilized for various features, a preferred embodiment of the present invention, as illustrated in FIG. 2, will include a wireless router module 32, a digital video recorder (DVR) module 34, a voice-over-internet-protocol (VOIP) module 36 and/or a television distribution module 38.

Each of the modules 32, 34, 36, 38 of the present invention are preferably configured and adapted to operate independently of the others to ease maintenance and prevent systematic failure due to an isolated occurrence in any one module. For example, the wires router module 32 and DVR module 34 will preferably be configured such that failure of the wireless router module 32 will not affect the video recording and/or playback functionality of the DVR module 34. In such a respect, the wireless router module 32 may be removed and repaired without affecting the overall operation of the non-wireless router functionality of the present invention. Further, each of the modules 32, 34, 36, 38 of the present invention may include its own processing unit or may share processing with the microprocessor 21.

The present invention will generally include a wireless router module 32 for directing the wireless distribution of internet signals by the primary unit 20. The wireless router module 32 will generally be comprised of electronic components which are interconnected in such a manner so as to receive, process and filter an internet signal received from the cable source 12 and/or internet source 13 and then wirelessly transmit the internet signal through wi-fi for wireless use by computers 66 or other devices.

The present invention will also generally include a digital video recorder module 34. The DVR module 34 will act to record video and audio data onto the hard drive 26 of the primary unit 20 for transmission via the primary transceiver 28 to one or more secondary units 40. Instructions regarding recording settings and hard drive maintenance may be received from secondary units 40 via the primary transceiver 28 and processed by the DVR module 34 and/or microprocessor 21. The DVR module 34 will also generally direct the primary transceiver 28 to stream the video and audio data of recorded programs from the hard drive 26 to the secondary units 40. It is also appreciated that the primary unit 20 will generally include a plurality of tuners such that a number of distinct television signals may be distributed to different secondary units 40. For example, the primary unit 20 may distribute a first television channel to a first secondary unit 40 while simultaneously distributing a second television channel or a pre-recorded program to a second secondary unit 40.

The present invention will also generally include a voice-over-internet-protocol (VOIP) module 36. The VOIP module 36 will generally be comprised of electronic components which are interconnected in such a manner so as to process, filter and transmit the VOIP signals via the primary transceiver 28 to one or more secondary units 40. The VOIP module 36 may utilize the microprocessor 21 of the primary unit 20 or may have its own separate microprocessor.

The present invention will also generally include a television distribution module 38 for processing, filtering and transmitting a television signal via the primary transceiver 28 to one or more secondary units 40. The television distribution module 38 will generally be comprised of electronic components which are interconnected in such a manner so as to receive, process, filter and distribute a cable or satellite television signal received via the cable signal source 12 and/or satellite signal source 13 to one or more secondary units 40.

The primary unit 20 of the present invention will generally be installed at or near the cable signal source 12 and/or satellite signal source 13 coming into a home. The primary unit 20 will generally be linked to the cable signal source 12 and/or the satellite signal source 13 via a wired connection 14 such as coaxial or fiber optic cable. However, it should be appreciated that the primary unity 20 may be configured to receive cable and/or satellite signals utilizing a wide variety of cables, wiring and other transmission means. In some embodiments, the primary unit 20 may be positioned outside the home to further reduce the clutter and unsightliness of cords. In such embodiments, the primary unit 20 will preferably be designed so as to resist the effects of weather elements such as heat, cold, wind and rain.

C. Secondary Units

The secondary unit 40 of the present invention will generally be comprised of electronic components interconnected within a common housing. A plurality of secondary units 40 may be used with the present invention, though in some embodiments it is appreciated that a single secondary unit 40 may be utilized.

The secondary unit 40 will generally act to receive, process, filter, decompress and display a television signal from the primary unit 20 of the present invention. The secondary unit 40 may be designed with many different appearances without affecting the overall operation of the present invention. It is also appreciated that the internal electronic components of the secondary unit 40 may vary and should not be limited to the exemplary configurations disclosed herein.

Figure 3:
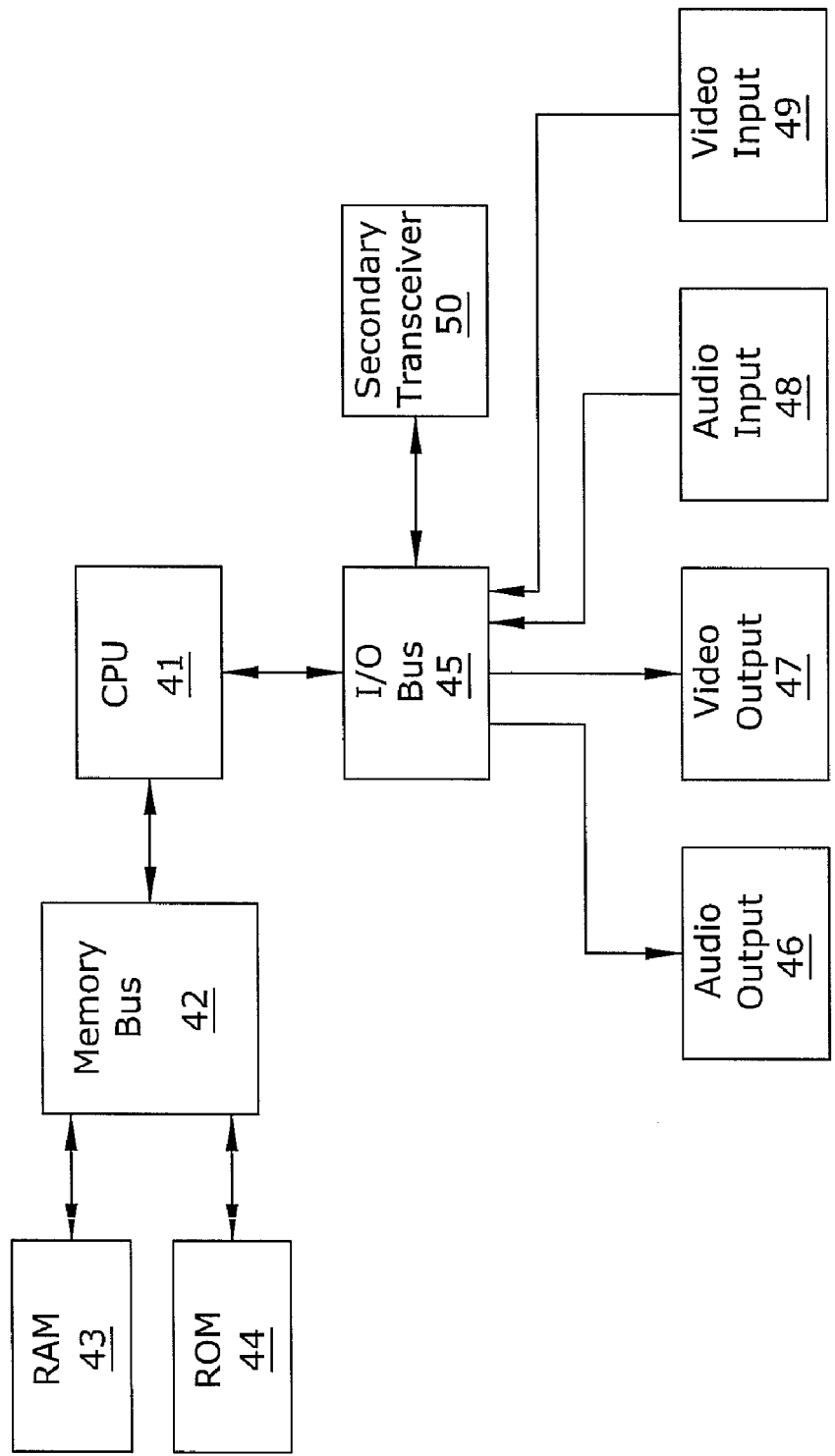
FIG. 3 is a block diagram illustrating one embodiment of a secondary unit for use with the present invention.

FIG. 3 is a block diagram of an exemplary primary unit 40 for performing the various functions of the present invention. The secondary unit 40 may be comprised of various configurations and designs, but will generally be comprised of a discrete box containing electronic components therein and a plurality of inputs and outputs. The secondary unit 40 will preferably be comprised of a small, rectangular housing having one or more audio outputs 46, video outputs 47, audio inputs 48 and/or video inputs 49. A secondary unit 40 will generally be placed near a secondary device such as a television, media player, game console, computer and/or VOIP telephone. The secondary unit 40 will also generally include its own microprocessor 41, memory bus, 42, random access memory (RAM) 43, read only memory (ROM) 44 and input/output bus 45. The secondary unit 40 will further generally include a secondary transceiver 50 for transmitting and receiving instructions and/or data to and/or from the primary unit 20.

The microprocessor 41 of the secondary unit 40 is generally comprised of a general purpose digital processor that controls the overall operation of the secondary unit 40. The microprocessor 41 may be a single-chip processor or may be implemented with multiple processor or components. Using instructions retrieved from memory such as RAM 23 or ROM 24, or communicated wirelessly by the primary transceiver 28 and received by the secondary transceiver 50, the microprocessor 41 of the secondary unit 40 controls the receiption, processing, filtering, decompression, manipulation and display of television and other signals received from the primary unit 20.

The input/output bus 45 is used by the microprocessor 41 of the secondary unit 40 to access data such as television signals sent via the primary transceiver 28 of the primary unit 20. The input/output bus 45 is also used by the microprocessor 41 of the secondary unit 40 to transmit data such as recording instructions for the DVR module 34 to the primary unit 20 via the secondary transceiver 50. Further, the input/output bus 45 will generally be used by the microprocessor 41 of the secondary unit 40 to receive, process and communicate video and/or audio signals via the audio/video inputs 48, 49 or outputs 46, 47.

The secondary unit 40 of the present invention will preferably include one or more audio outputs 46, video outputs 47, audio inputs 48 and/or video inputs 49. The A/V inputs 48, 49 will generally be utilized to receive video and/or audio data from an output device such as a DVD player 62 or game console 64. Video and/or audio data received from the output device will generally be processed by the secondary unit 40 and then displayed on a television 60 or other display device (i.e. a monitor, projector or the like) via the A/V outputs 46, 47.

It is appreciated that the A/V inputs 48, 49 and outputs 46, 47 may be comprised of various different types of ports for receiving or transmitting digital and/or analog audio and/or video signals. It is also appreciated that, depending on the technology utilized, the A/V inputs 48, 49 and/or outputs 46, 47 may be integrated. In other embodiments, the video input 48 could be comprised of a plurality of inputs. Although the scope of the present invention should not be limited to such types of inputs/outputs, an exemplary list of such types of inputs/outputs includes RCA (one video ports and two audio ports), DVI (single video port) or HDMI (integrated video and audio port). One of ordinary skill in the art will appreciate that various other types of input/output ports may be utilized for the audio/video transferring functions of the secondary unit 40, including technologies not readily commercially available at the time of filing.

D. Overall Operation of Preferred Embodiment

In use, the primary unit 20 is first positioned at or near the signal source 12, 13 and linked thereto by a wired connection 14. In a preferred embodiment, a cable signal source 12 which includes a cable internet signal will be connected to the input/output bus 27 of the primary unit 20 via a coaxial cable 14. A satellite signal source 13 which includes a satellite television signal will be connected to the input/output bus 27 of the primary unit 20 via a second coaxial cable 14.

With the primary unit 20 connected to the signal sources 12, 13 via a wired connection 14, the one or more secondary units 40 will generally be positioned at their respective locations and configured for use with the primary unit 20. Each secondary unit 40 will include its own identification code (i.e. a MAC address) which will be programmed into the primary unit 20 to create two-way communications between the primary unit 20 and each respective secondary unit 40. It is appreciated that identification codes for a plurality of secondary units 40 may be associated with or disassociated with the primary unit 20 at any time for security purposes. The primary unit 20 will be able to identify instructions and/or data received from a particular secondary unit 40 by the unique identification code.

Similarly, the primary unit 20 will ignore any instructions and/or data received from a secondary unit 40 which is not associated with the primary unit 20. It is also appreciated that each secondary unit 40 will be paired directly with a single primary unit 20, and will not recognize data and/or instructions received wirelessly from any source other than the primary transceiver 28.

Each secondary unit 40 which is associated with the primary unit 20 will then be linked to a secondary device such as a television 60, personal computer 66 or VOIP phone 68. With respect to use with a television 60, the video/audio outputs 46, 47 of the secondary unit 40 will be connected to the video/audio inputs of the television 60 (not shown) via a wired connection 14 such as HDMI, RCA, coaxial cable or component cables. If an output device such as a game console 64 or DVD player 62 is desired to be connected to the television 60, the outputs of the output device (not shown) will be connected via a wired connection 14 to the audio/video inputs 48, 49 of the secondary unit 40.

The primary unit 20 will act to receive a television signal via its wired connection 14 with the signal source 12, 13. The television signal will then be filtered, compressed and transferred to the secondary unit(s) 40 via the primary transceiver 28. Each secondary unit 40 will receive the wireless signal from the primary transceiver 28 via the secondary transceiver 50. The television signal will then be decompressed and displayed on the attached display device such as a television 60.

The secondary transceiver 50 will also act to send and receive instructions to/from the primary unit 20. For example, utilizing the secondary unit 40, an operator of the present invention could select television programs for future recording. The data will be transferred to the primary unit 20, which will store instructions in its memory to record the television signal to its hard drive 26 for later viewing. The secondary unit 40 may then at a future time transmit a signal to the primary unit 20 instructing the primary transceiver 28 to transmit the recorded program to the secondary unit 40 for viewing. Channel selections and other television program viewing functionality may also be accomplished by utilizing similar methods for transmitting and receiving instructions by the secondary unit 40.

With respect to internet signals, the primary unit 20 will generally receive an internet signal via its wired connection 14 with the cable source 12. Internet data will be received by the primary unit 20 and then transmitted to secondary units such as a personal computer 66 or VOIP phone 68 via the primary transceiver 28 or Ethernet outputs 29. By way of example, a VOIP phone 68 could be connected directly to a secondary unit 40 via a wired connection 14 such as an Ethernet cable as shown in FIG. 1. The primary unit 20 would receive the data from the cable source 13 and, utilizing both the primary transceiver 28 and secondary transceiver 50, receive and/or transmit the data necessary to effectuate a voice over internet protocol phone call using the VOIP phone 68. Additionally, a personal computer 66 could access the Internet by a wired connection 14 with the Ethernet output 29 of the primary unit 20 or by a wi-fi utilizing the primary and secondary transceivers 28, 50. It is also appreciated that a personal computer 66 could access the Internet by utilizing an existing wi-fi card as is known in the art to access the signal being transmitted by the primary transceiver 28. In such a manner, a single primary unit 20 may fulfill the functionality of a cable modem, wireless router and wireless television distributor without the need for multiple electronic devices or wires.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A wireless signal transceiver system, comprising:
   a primary unit communicatively interconnected with a television signal source and an internet signal source, wherein said television signal source is comprised of a satellite television signal source, wherein said internet signal source is comprised of a cable source;
   a plurality of secondary units in wireless communication with said primary unit, wherein each of said plurality of secondary units includes an A/V input and an A/V output, wherein said plurality of secondary units is comprised of a first secondary unit, a second secondary unit, a third secondary unit and a fourth secondary unit;
   a primary transceiver on said primary unit for wirelessly transmitting data to and receiving data from a secondary transceiver on each of said plurality of secondary units;
   wherein said primary unit is adapted to transmit said television signal and said internet signal to said plurality of secondary units
   a DVD player connected to said A/V input of said first secondary unit and a television connected to said A/V output of said first secondary unit;
   a gaming console connected to said A/V input of said second secondary unit and a television connected to said A/V output of said second secondary unit;
   a VOIP telephone connected to said third secondary unit;
   a first personal computer connected to said fourth secondary unit; and
   a second personal computer connected directly to said primary unit.

* * * * *